(12) United States Patent
Fenu et al.

(10) Patent No.: US 9,643,704 B2
(45) Date of Patent: May 9, 2017

(54) COUPLING PROVISIONS FOR DIVER PROPULSION VEHICLE

(71) Applicant: Suex S.R.L., Villorba (IT)

(72) Inventors: Alessandro Fenu, Villorba (IT); Marco Segatto, Treviso (IT); Arne Sieber, Zell am See (AT)

(73) Assignee: Suex S.R.L., Villorba, Treviso (IT)

( * ) Notice: Subject to any disclaimer, the term of this patent is extended or adjusted under 35 U.S.C. 154(b) by 0 days.

(21) Appl. No.: 14/719,186

(22) Filed: May 21, 2015

(65) Prior Publication Data

US 2015/0336650 A1 Nov. 26, 2015

(30) Foreign Application Priority Data

May 21, 2014 (IT) .............................. TO2014A0406

(51) Int. Cl.
*B63C 11/46* (2006.01)
*B63H 23/24* (2006.01)
*B63B 17/00* (2006.01)
*B63B 35/73* (2006.01)
*B63H 25/02* (2006.01)
*H04B 1/3822* (2015.01)
*H04B 10/80* (2013.01)
*B63C 11/26* (2006.01)
*B63C 11/02* (2006.01)

(52) U.S. Cl.
CPC ............. *B63H 23/24* (2013.01); *B63B 17/00* (2013.01); *B63B 35/73* (2013.01); *B63C 11/26* (2013.01); *B63C 11/46* (2013.01); *B63H 25/02* (2013.01); *H04B 1/3822* (2013.01); *H04B 10/80* (2013.01); *B63C 2011/021* (2013.01); *B63H 2025/028* (2013.01)

(58) Field of Classification Search
CPC ...... B63H 23/34; B63H 25/02; H04B 1/3822; H04B 10/80; B63C 11/46; A63B 35/00; B63G 8/14
USPC ................................ 114/312, 313, 315, 330
See application file for complete search history.

(56) References Cited

U.S. PATENT DOCUMENTS 3,034,467 A 5/1962 Pestronk
3,066,638 A 12/1962 Andresen, Jr.
(Continued)

FOREIGN PATENT DOCUMENTS

DE 35 13 515 A1 10/1986
DE 103 54 314 A1 6/2005
(Continued)

OTHER PUBLICATIONS

Office action issued in related U.S. Appl. No. 14/719,195 on Apr. 13, 2016, 11 pages.

*Primary Examiner* — Daniel V Venne
(74) *Attorney, Agent, or Firm* — Lewis Roca Rothgerber Christie LLP (57) ABSTRACT

An arrangement comprises:
a plurality of diver propulsion vehicles (1), each configured for propelling at least one diver, wherein each diver propulsion vehicle (1) comprises a wireless communication interface (9, 10, 13) configured for providing a wireless communication,
a support (30) for mechanically coupling the plurality of diver propulsion vehicles (1), wherein the support (30) is configured for mechanically coupling the plurality of diver propulsion vehicles (1) side-by-side or longitudinally via the support (30).

8 Claims, 11 Drawing Sheets

(56) References Cited

U.S. PATENT DOCUMENTS

| | | | |
|---|---|---|---|
| 3,128,739 A | 4/1964 | Schultz | |
| 3,131,664 A | 5/1964 | McInvale | |
| 3,323,481 A * | 6/1967 | Harvey | A63B 35/12 114/315 |
| 3,329,118 A | 7/1967 | Strader | |
| 3,411,474 A * | 11/1968 | Curtis | A63B 35/125 114/315 |
| 3,422,787 A * | 1/1969 | Rush | A63B 35/12 114/315 |
| 3,635,188 A | 1/1972 | Rutkowski | |
| 3,757,721 A * | 9/1973 | Ohishi | A63B 35/12 114/315 |
| 3,957,007 A * | 5/1976 | Thomas | A63B 35/125 114/315 |
| 3,995,578 A | 12/1976 | McCullough | |
| 4,220,110 A | 9/1980 | Roberson, Sr. et al. | |
| 4,467,742 A | 8/1984 | Duboy | |
| 4,753,187 A | 6/1988 | Galimand | |
| 4,843,998 A | 7/1989 | Parker | |
| 4,996,938 A * | 3/1991 | Cameron | A63B 35/12 114/315 |
| 5,024,178 A * | 6/1991 | Bruce | A63B 35/12 114/315 |
| 5,379,714 A * | 1/1995 | Lewis | B63G 8/08 114/315 |
| 5,433,164 A * | 7/1995 | Sneath | B63C 11/46 114/315 |
| 5,509,372 A | 4/1996 | Culotta | |
| 5,984,739 A | 11/1999 | Donahue | |
| 6,461,204 B1 | 10/2002 | Takura et al. | |
| 6,823,813 B2 | 11/2004 | Mazin | |
| 7,124,701 B2 | 10/2006 | Valente | |
| 7,527,011 B2 | 5/2009 | Smith | |
| 8,249,764 B2 | 8/2012 | Bauer et al. | |
| 9,180,343 B2 * | 11/2015 | Yeo | A63B 35/12 |
| 2001/0018886 A1 * | 9/2001 | Holmes | B63B 21/66 114/312 |
| 2004/0185723 A1 | 9/2004 | Grimmeisen | |
| 2005/0166827 A1 * | 8/2005 | Holmes | B63B 21/62 114/330 |
| 2006/0081167 A1 * | 4/2006 | Valente | A63B 35/12 114/315 |
| 2010/0212571 A1 * | 8/2010 | White | A63B 35/12 114/315 |
| 2015/0136012 A1 * | 5/2015 | Williams | B63G 8/001 114/312 |
| 2015/0336650 A1 | 11/2015 | Fenu et al. | |

FOREIGN PATENT DOCUMENTS

| | | |
|---|---|---|
| DE | 10 2005 001 817 A1 | 7/2006 |
| EP | 1 272 389 | 1/2003 |
| EP | 2 088 076 A2 | 8/2009 |
| FR | 2 041 563 | 1/1971 |

* cited by examiner

COUPLING PROVISIONS FOR DIVER PROPULSION VEHICLE

CROSS-REFERENCE TO RELATED APPLICATION(S)

This application claims priority to and benefit of Italian Patent Application Number TO2014A000406, filed on May 21, 2014, the entire disclosure of which is incorporated herein by reference.

The invention relates to an assembly of diver propulsion vehicles and to a method of operating an assembly of diver propulsion vehicles.

Scuba divers have limited operating range. The operation range is mainly limited by the gas supply and by the time the diver can stay within the water. The maximum distance the diver can travel is limited and is linked strongly to the diver's physical endurance.

To enlarge the distance the diver can travel underwater and to increase the travel speed, diver propulsion vehicles (DPV) are used.

Such diver propulsion vehicles can be used for recreational diving, for underwater exploration of caves, for technical diving, etc., where sometimes long distances have to be travelled underwater and in short time.

For some applications it is a requirement, that the diver propulsion vehicle and the divers can be deployed by a submarine. In such cases, the equipment is usually deployed through a hatch. Thus, one central requirement for the design of diver propulsion vehicle equipment is that they can fit into a hatch. If the diver propulsion vehicle is too large to fit into a hatch, the diver propulsion vehicle may be designed in a modular way, where each single module is small enough to fit into the hatch, and once locked out, the modules are assembled.

In diver propulsion vehicle, design is always a tradeoff between distance, speed and maximum drag that can be travelled, and size and weight of the device.

A diver propulsion vehicle usually comprises a pressure resistant watertight casing containing a motor which drives a propeller and a battery. The design shall ensure that the propeller cannot harm the diver, diving equipment or marine life, the vehicle cannot be accidentally started or run away from the diver, and it remains neutrally buoyant while in use underwater.

The most common type of diver propulsion vehicle tows the diver who holds onto handles on the stern or bow. Tow-behind scooters are efficient by placing the diver parallel to and above the propeller wash. The diver wears a harness that includes a crotch-strap with a D-ring on the front of the strap. The scooter is rigged with a tow leash that clips to the scooter with releasable metal snap.

There exist some alternatives to diver tug diver propulsion vehicles: In certain diver propulsion vehicles one or more divers are typically sitting astride them or in hollows inside the diver propulsion vehicle. Alternatives exist, where the thruster is mounted on the tank of a diver. Alternatively there are also embodiments, where the thrusters are mounted on the extremities of a diver, for instance on the upper legs.

Larger diver propulsion vehicles gradually merge into small submarines, often referred to wet subs. A wet sub is a small submarine where the pilots and the passenger seats are flooded and the divers wear diving gear.

U.S. Pat. No. 3,131,664 discloses an underwater sledge. DE 10354314 A1 describes an underwater diver propulsion vehicle, where the thrust is not generated with an electric motor but from a pressured gas supply, and the gas as well as the breathing gas is supplied from the same pressure container. U.S. Pat. No. 5,509,372 discloses the electrical control mechanism of a diver propulsion vehicle, which is used to avoid unsafe fast ascents. EP 1,272,389 describes a diver propulsion vehicle with neutral buoyancy and pivotable pylon steering. FR 2 041 563 discloses an underwater vehicle for divers. The divers sit upright upon the vehicle, and thus increase the drag of the vehicle. DE 35 13 515 discloses an underwater craft, where the diver lies on a deck. U.S. Pat. No. 7,527,011 discloses a system, where the thrust is generated not from batteries but from compressed gas from scuba tanks.

Shortcomings in current man tug diver propulsion vehicles are limited reliability, limited thrust and lack of redundancy. Common commercially available diver propulsion vehicles which tow the diver have just one motor and one battery compartment. If one part fails, the diver propulsion vehicle becomes unusable. For this reason, many cave divers for instance, who penetrate long underwater caves and rely on their diver propulsion vehicle, tow an alternative diver propulsion vehicle behind them, so that in the case of a failure, they have a backup diver propulsion vehicle.

Conventional diver propulsion vehicles have only limited thrust. Diver propulsion vehicles are usually designed to tow at maximum two divers at once, but some applications may require that more divers are towed at once.

Furthermore, conventional diver propulsion vehicles have only limited operating range. There is a tradeoff between size of the diver propulsion vehicle and the operating range, as the operation range mainly depends on the battery size.

One could enlarge the size of the diver propulsion vehicle, to be able to tow more divers at once, but this at the cost of larger size, more weight and/or less operating range. If the size of the diver propulsion vehicle is enlarged too much, then it possibly does not fit anymore into a hatch.

It is an object of the invention to provide a diver propulsion vehicle which overcomes at least part of the above and/or other shortcomings.

The object is solved by the independent claims. Further embodiments are shown by the dependent claims.

According to an exemplary embodiment of the invention, an assembly is provided, which comprises:

a plurality of diver propulsion vehicles, each configured for propelling (or moving) at least one diver, wherein the diver propulsion vehicle comprises a wireless communication interface (i.e. an entity which enables the diver propulsion vehicle to communicate wirelessly, in particular via the transmission of waves or radiation) configured for providing a wireless communication, and a support for mechanically coupling the plurality of diver propulsion vehicles, wherein the support is configured for mechanically coupling the plurality of diver propulsion vehicles side-by-side or longitudinally via the support.

According to another exemplary embodiment of the invention, a method of operating an assembly of diver propulsion vehicles is provided, the vehicles being mechanically coupled side-by-side or longitudinally via a support, each of the diver propulsion vehicles being configured for propelling at least one diver, wherein the method comprises wirelessly communicating by each of the diver propulsion vehicle via a wireless communication interface of each of the diver propulsion vehicle.

According to one exemplary aspect, each of the diver propulsion vehicles of the assembly is capable of wirelessly communicating, underwater and hence during operation, with another diver propulsion vehicle of the assembly and/or among different portions, sections or members of one and the same diver propulsion vehicle without a wire connection. Such a communication architecture allows to maintain the diver propulsion vehicle water sealed, with a high operating range, flexibly operable, and failure resistant.

In the following, further exemplary embodiments of the assembly and the method will be explained.

Diver propulsion vehicles according to the invention may ensure at least one of the following:

- Compartments of the diver propulsion vehicle may be sealed, so that in the event of water intrusion, only one compartment is flooded. Therefore, very few cable connections (if any) inside the scooter may be sufficient.
- Divers may be deployed from submarines through hatches. The size/diameter of the diver propulsion vehicles or scooters can be small enough, even when coupled in the longitudinal configuration, to fit even into a small-dimensioned hatch of a submarine.
- The diver propulsion vehicle(s) may have enough thrust, in order to be able to tow multiple divers at once, in particular in a mechanically coupled state of several diver propulsion vehicles.
- The diver propulsion vehicles can have a large and a predictable operating range, which can be displayed to a diver during the dive.
- The diver propulsion vehicle is failure resistant, when multiple redundant diver propulsion vehicles are foreseen which are coupled together to cooperate functionally.
- The diver propulsion vehicle can be easy to navigate and operable with preferable a single hand.
- The diver propulsion vehicle can be compact and lightweight, so that a respective one of diver propulsion vehicles can be carried by a single diver.
- In order to plan a dive, the diver propulsion vehicle may inform the diver about the remaining runtime of the diver propulsion vehicle rather than providing a simple battery voltage indicator, as a battery voltage indicator only poorly reflects the charge status of a rechargeable battery.
- The diver propulsion vehicle can be able to measure the velocity and travelled distance.

Embodiments of the present invention fulfil the above listed requirements with an intelligent control and data communication system within the diver propulsion vehicle. Another aspect is the coupling of two or more diver propulsion vehicles in parallel with a foldable support, so that they still can be locked out through a hatch.

In an embodiment, the diver propulsion vehicles may be equipped with a digital communication and control system. The messages from the transmitters may be transmitted in regular intervals, preferable ranging from few times per minute to several transmissions per second. The messages sent from the different transmitters may also have a checksum at the end of the message. In the event, that two transmitters send at the same time, the received message is corrupt, but this can be detected with the checksum, which will be incorrect in this case, and the message may be not further processed.

In an embodiment, the wireless communication interface is configured for providing a wireless communication between the diver propulsion vehicle and a communication partner device (in particular one of the group consisting of another diver propulsion vehicle, a diver worn head up display, and a diver worn dive computer). In one embodiment, the diver propulsion vehicle data may be transmitted to peripheral equipment which may be a diver worn head up display or a diver worn dive computer. Thus, an exemplary embodiment of the invention relates to a combination of the above-mentioned diver propulsion vehicle and the peripheral equipment which may be communicatively coupled to one another. Additionally or alternatively, the diver propulsion vehicle may be communicatively coupled in a wireless manner to another diver propulsion vehicle of the assembly so that these two diver propulsion vehicles may exchange data (either unidirectionally or bidirectionally). In such an embodiment, the mechanically coupled diver propulsion vehicles may also functionally cooperate, for instance may be synchronized in terms of moving one or more divers operating the mechanically and communicatively coupled diver propulsion vehicles. Thus, an exemplary embodiment accomplishes an inter-vehicle communication (and optionally functional cooperation) among different diver propulsion vehicles.

In an embodiment, the wireless communication interface is configured for providing a wireless communication between different sections of the same diver propulsion vehicle. Data may be transmitted wirelessly through different compartments inside the scooter through transparent windows or the like, therefore no additional cables for data transmission are required and different compartments or sections within a scooter remain sealed. Thus, an exemplary embodiment accomplishes an intra-vehicle communication (and optionally functional cooperation) among different sections (such as functional or spatial groups) of one and the same diver propulsion vehicle. When such a communication is wireless, the requirements in terms of guiding cables in a waterproof manner through the sections of the diver propulsion vehicle become dispensable.

In an embodiment, the wireless communication interface is configured for providing a wireless communication between a battery unit and a display unit of the diver propulsion vehicle. The data may be transmitted from the battery wirelessly to a display. Thus, a user of the diver propulsion vehicle always remains informed about the remaining battery capacity or loading state of the battery unit so that the diver can plan the trip more safely and accurately.

In an embodiment, the display unit is configured for displaying an indicator, in particular a numerical indicator, of a remaining runtime of the diver propulsion vehicle (in particular until the battery unit is empty or is unloaded to such an extent that it can no longer propel the diver propulsion vehicle). A corresponding battery charge management system may measure the electric charge and/or current going out of the battery as well as the charge and/or current going into the battery when the battery is charged. This allows a very precise estimation of the charge capacity of the battery. During operation, by measuring the electrical current, this also allows a precise estimation of the remaining runtime at the speed the motor is currently running. The remaining runtime may be displayed visually, such as in the form of a bar having a length corresponding to the remaining runtime. Additionally or alternatively, the remaining runtime may be displayed by a value, for instance a remaining time for which the battery can continue to power the diver propulsion vehicle.

In an embodiment, the wireless communication interface is configured for providing a wireless communication between a speed measurement unit of the diver propulsion vehicle and another section of the diver propulsion vehicle. A speed measurement wheel or propeller may be mounted on the diver propulsion vehicle, preferably on the nose. A microcontroller may measure the revolutions within a certain timeframe and may calculate the speed and the distance travelled. The data may be transmitted via infrared through the diver propulsion vehicle or outside the diver propulsion vehicle to the handle of the diver propulsion vehicle.

A GPS buoy, which may be mounted for instance on the diver propulsion vehicle, may be deployed. The data from the GPS buoy can be used to auto calibrate the speed and distance measuring wheel.

In an embodiment, the wireless communication interface is configured for providing an electromagnetic communication. Electromagnetic data transmission may be used in the described underwater apparatus to wirelessly transmit data between diver propulsion vehicles and/or between sections of one and the same diver propulsion vehicle.

In a preferred embodiment, the wireless communication interface is configured for providing an infrared communication. In the context of the present application, the term "infrared" may particularly denote electromagnetic radiation with longer wavelengths than those of visible light and shorter wavelengths than those of Terahertz radiation. Infrared radiation which may be implemented particularly advantageously according to exemplary embodiments of the invention may in particular extend from 700 nm to 1.4 µm, more particularly from 780 nm to 1 µm. It has turned out to be highly advantageous to use infrared communication under water, since infrared radiation is capable of propagating through water, and the hardware required for infrared communication is compatible with both aqueous conditions as well as high pressure conditions as present in a diving scenario. The data communication may hence be based on an infrared transmission protocol. An advantage is that the infrared communication on the one hand fulfills antimagnetic requirements appreciated for certain diver applications and on the other hand allows high data rates even for transmissions through water.

With regard to exemplary embodiments of the invention, IR transmission has several distinct advantages over other communication systems:

a) The bandwidth is high, thus even large amounts of data can be transmitted.

b) IR radiation is robust against being disturbed by the electric motor or the control of the electric motor of the diver propulsion vehicle.

In an embodiment, the diver propulsion vehicle comprises at least one display, in particular located on a hull of the diver propulsion vehicle and/or on a handle of the diver propulsion vehicle, and configured for displaying data indicative of an operation of the diver propulsion vehicle. Diver propulsion vehicle data may hence be transmitted to a display located on the handle of the diver propulsion vehicle. The IR link can also be used to send the data directly onto the display.

Such a display (which, in an embodiment, may be denoted as a primary display) may be located on the diver propulsion vehicle. It may be equipped with an IR receiver. It can receive different messages from a battery and/or a speed wheel. The display can be a numeric display, an LCD display, or a simple display formed of one or more LEDs.

Such a display (which, in an embodiment may be denoted as a secondary display) may be mounted on the handle which is equipped with an infrared receiver. Various kind of data may be shown on the display, including battery voltage, remaining runtime, electrical current, charge status, velocity, distance, heading in connection with a digital compass, GPS coordinates in connection with a GPS buoy, depth in connection with a depth/pressure sensor, decompression obligations, and/or location data from a inertial navigation system based on accelerometers, gyroscopes and/or flow/speed meters.

In an embodiment, the diver propulsion vehicle comprises at least one wireless communication bridge configured for receiving a wireless communication signal from a communication source and retransmitting a wireless communication signal to a communication destination, in particular a communication destination outside of the diver propulsion vehicle. One or more additional wireless bridges may be mounted, which transmit signals outside of the diver propulsion vehicle. The diver propulsion vehicle may include also IR bridges, which can be formed of an infrared receiver and a transmitter. They may receive an IR data string and transmit it again, without further processing. Such IR bridges may be used to extend the range of the IR communication within and outside of the diver propulsion vehicle. Such infrared bridges may have the advantage that they can be mounted without cables which is of utmost importance and advantage in the aqueous and high pressure environment of diving.

In an embodiment, the diver propulsion vehicle comprises a motor control unit configured for controlling a motor for driving the diver propulsion vehicle by wireless communication. When the motor control may be controlled wirelessly, this significantly eases motor control as compared to a cable-based control in view of the harsh aqueous conditions and high pressure requirements of exemplary embodiments.

In an embodiment, the diver propulsion vehicle comprises a mechanical barrier operable (for instance movable) so as to mechanically block a wireless communication signal to thereby (at least temporarily) block or disable wireless communication via the wireless communication interface. Such a mechanical barrier may be a movable (for instance slidable or pivotable) body being opaque for the electromagnetic radiation (for instance infrared radiation) used for the communication. For instance, the mechanical barrier may be a cover or a light shade. Moving such a mechanical barrier in front of an infrared transmitter and/or receiver of the diver propulsion vehicle may selectively and temporarily prevent infrared-based communication. In a combination of two or more diver propulsion vehicles, the wireless communication can hence be interrupted with a mechanical barrier.

IR windows of the diver propulsion vehicles may be oriented towards each other, so that the infrared transmission is also possible in water with bad visibility. Additionally, the mechanical barrier (or cover or aperture) apparatus may be integrated, which may block the infrared transmission between the diver propulsion vehicles.

This has the following advantages:

a) In case of a malfunction, the IR transmission can be blocked to stop a slave diver propulsion vehicle.

b) If the diver wants to do a sharp turn with the diver propulsion vehicle, the diver may prefer to operate only one diver propulsion vehicle. Therefore, the diver can block the IR transmission, the slave diver propulsion vehicle is switched off, but the primary master diver propulsion vehicle still operates, thus the diver propulsion vehicle changes direction towards the slave diver propulsion vehicle.

In an embodiment, the diver propulsion vehicles are configured so that, in an event that one of the diver propulsion vehicles initiates wireless communication via the wireless communication interfaces, the communication initiating diver propulsion vehicle acts as master and the other diver propulsion vehicle acts as slave during the wireless communication. Initiation of the communication may be triggered by a user operating a corresponding trigger of the diver propulsion vehicle which shall act as master. Hence, each diver propulsion vehicle in the combination can act as master or as slave, dependent on which diver propulsion vehicle is operated by the diver. This communication architecture is highly advantageous since it is clarifies the master-slave relationship between the different diver propulsion vehicles which may be triggered in a simple and intuitive manner by a user.

One challenge is the operation of such a combined and coupled diver propulsion vehicle system, as the independent diver propulsion vehicles have independent triggers. An embodiment of the invention solves the problem by using an IR link so that one scooter can communicate with others. In particular each of the scooters is equipped with one or more IR transmission windows which are located on the side of the scooter. When the diver now operates one trigger of one diver propulsion vehicle, this diver propulsion vehicle then transmits an IR signal to the diver propulsion vehicle connected and therefore acts as a master. The other diver propulsion vehicle, connected to the "master diver propulsion vehicle" receives the signal and the motor inside the diver propulsion vehicle is operated accordingly. The system may be designed in a way that a trigger operation always overrides the IR transmission, thus each diver propulsion vehicle can act as master as well as slave. This addresses additional redundancy. The benefits of such an embodiment are manifold:

a) The system comprises one or more diver propulsion vehicles, thus if one diver propulsion vehicle fails, the other one still remains intact.

b) The system can be single hand operated with a single trigger.

c) Each diver propulsion vehicle can act either as master or slave, and each diver propulsion vehicle can also be used independently by divers.

d) No mechanical interconnection of moving parts is required to couple triggers, which increases the mechanical robustness of the system.

In an embodiment, the plurality of diver propulsion vehicles are communicatively coupled to one another so as to synchronize motors of the plurality of diver propulsion vehicles for a cooperating propelling of the plurality of diver propulsion vehicles in a mechanically coupled state. When multiple motors are operated for moving multiple diver propulsion vehicles, their operation can be matched so that a desired motion characteristic is achieved. Thus, a combination of two or more diver propulsion vehicles may be provided, where the diver propulsion vehicle motors are synchronized, in particular synchronized with a wireless transmission.

On a handle of the diver propulsion device configured for being manually operated by a diver, a trigger (such as a lever, a button, etc.) may be mounted. The trigger may operate (for instance inductive or magnetic or mechanical) switches, which may be further connected to the motor control in the diver propulsion vehicle. The trigger allows single hand operation of the diver propulsion vehicle.

The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

The illustrations in the drawings are schematical. In different drawings, similar or identical elements are provided with the same reference signs.

Figure 1:
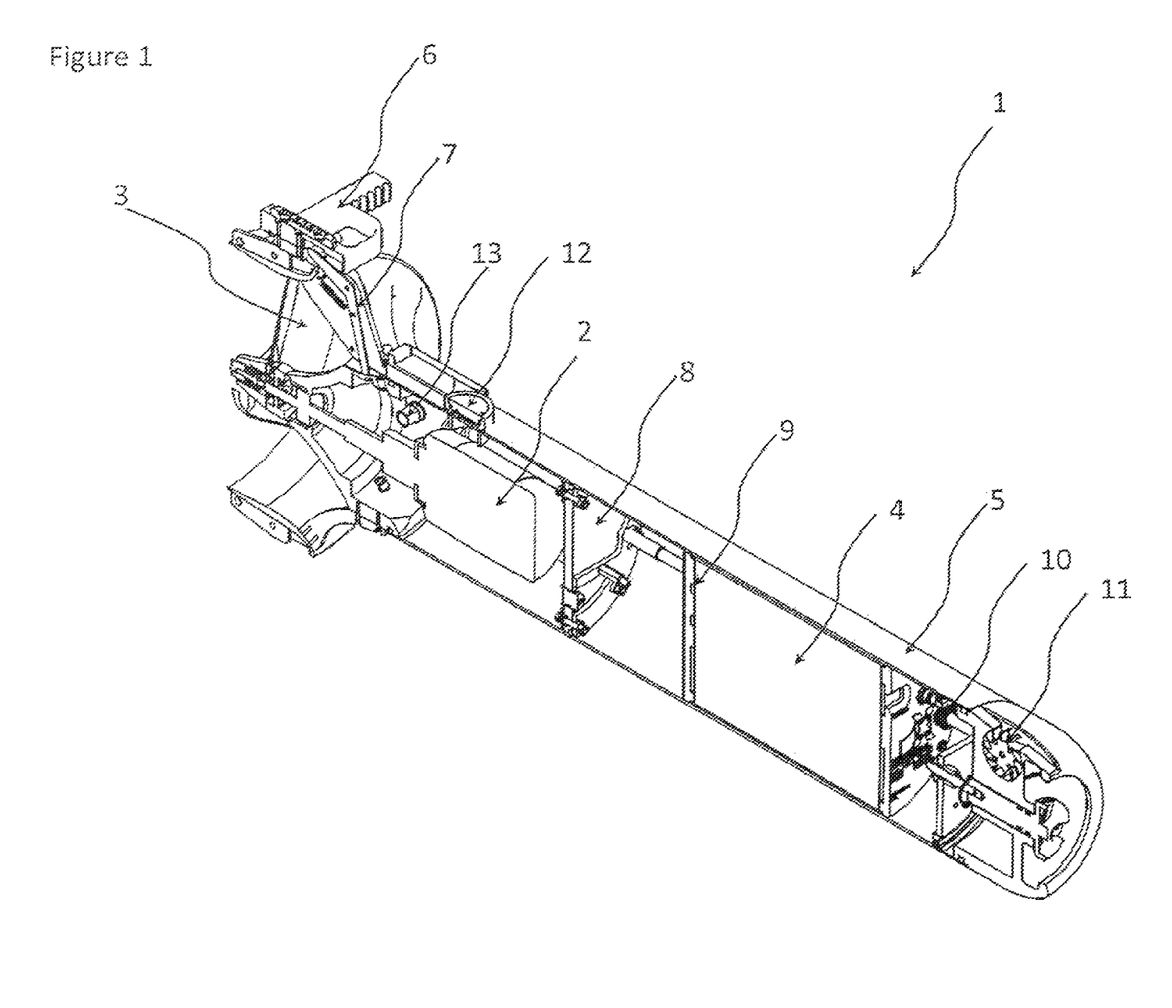
FIG. 1 shows a longitudinal cross-section of a diver propulsion vehicle.

FIG. 1 shows a longitudinal cross section of diver propulsion vehicle 1.

A motor 2 drives a propeller 3 located at the end of the diver propulsion vehicle 1. The battery 4 is located in a front section of the diver propulsion vehicle. Motor 2 as well as battery 4 are located so that the diver propulsion vehicle 1 is balanced in water. A watertight hull 5 houses the motor 2, the battery 4, electronics, etc. Preferably, such a hull 5 is round cylindrically shaped, to withstand higher water pressures. The hull 5 may be fabricated from plastics, metals or fiber and resin laminates, like carbon or glass fiber constructions. A handle 6, to be operated by a user manually, is located on the end of the diver propulsion vehicle 1. A trigger 7 is arranged at the handle 6 of the diver propulsion vehicle 1 and can be actuated by the hand of the user when being placed on the handle 6. A waterproof barrier 8 is located in between the battery 4 and the motor 2, and thereby separates a battery section from a motor section of the diver propulsion vehicle 1. Thus, in the undesired event of a water intrusion, not the complete diver propulsion vehicle 1 will be flooded, but the waterproof barrier 8 will limit water intrusion. The barrier 8 is either completely transparent for infrared (IR) light or is equipped with a window, so that IR light can be transmitted through it when communication within the diver propulsion vehicle 1 (i.e. between different sections thereof) is carried out by infrared communication.

A first IR transmitter 9 is located at the battery 4, which transmits data from the battery management system. This data may include current, remaining charge, remaining runtime and/or battery voltage.

A second IR transmitter 10 is located on a speed measurement unit. The speed measurement unit can be based on different technologies, for instance a simple wheel 11, a propeller or on flow meters. Data from the speed measurement wheel 11 is transmitted to the back of the diver propulsion vehicle 1. Alternatively, there may be a cable line between the speed measurement unit and the battery 4. In this configuration, a combined IR transmitter may send the data both of battery 4 as well as speed measurement unit.

A display 12 is located at a back part of the diver propulsion vehicle 1 close to the motor 2 so as to be properly visible for a diver towed by the diver propulsion vehicle 1. It may comprise an alphanumerical display or may be designed in a simpler way, consisting of only one or more LEDs. One LED may be also an IR diode, forwarding the IR messages outside the diver propulsion vehicle 1 to external components, like for instance a dive computer mounted on the handle 6 of the diver propulsion vehicle 1 or worn on the wrist of the diver.

An IR bridge may be located close to the handle 6. Details concerning the configuration of the IR bridge can be taken from FIG. 8. The IR bridge receives IR signals from inside the diver propulsion vehicle 1 and transmits them outside the hull 5. This IR bridge may comprise or consist of a microcontroller, an IR receiver and an IR transmitting diode. Alternatively, in a simpler from, a mirror and a window may be sufficient, to transmit data outside.

A combined IR transmitter and receiver 13 is located on one side or on both opposing sides of the diver propulsion vehicle 1. It can be used to couple multiple diver propulsion vehicles 1 of the type shown in the figures, for instance to synchronize their speed. If the trigger 7 of one of two or more coupled diver propulsion vehicles 1 is pulled, than this diver propulsion vehicle 1 acts as master, and transmits signals. The other diver propulsion vehicle 1, which is coupled to the master, receives the signals and acts as slave.

Hence, IR transmitters 9, 10 and IR transmitter and receiver 13 of the diver propulsion vehicle 1 function as a wireless communication interface 9, 10, 13 configured for providing a wireless communication within the diver propulsion vehicle 1 and between different diver propulsion vehicles 1 and/or with another communication partner device such as a diver worn head up display, a diver worn dive computer, etc.

Figure 2:
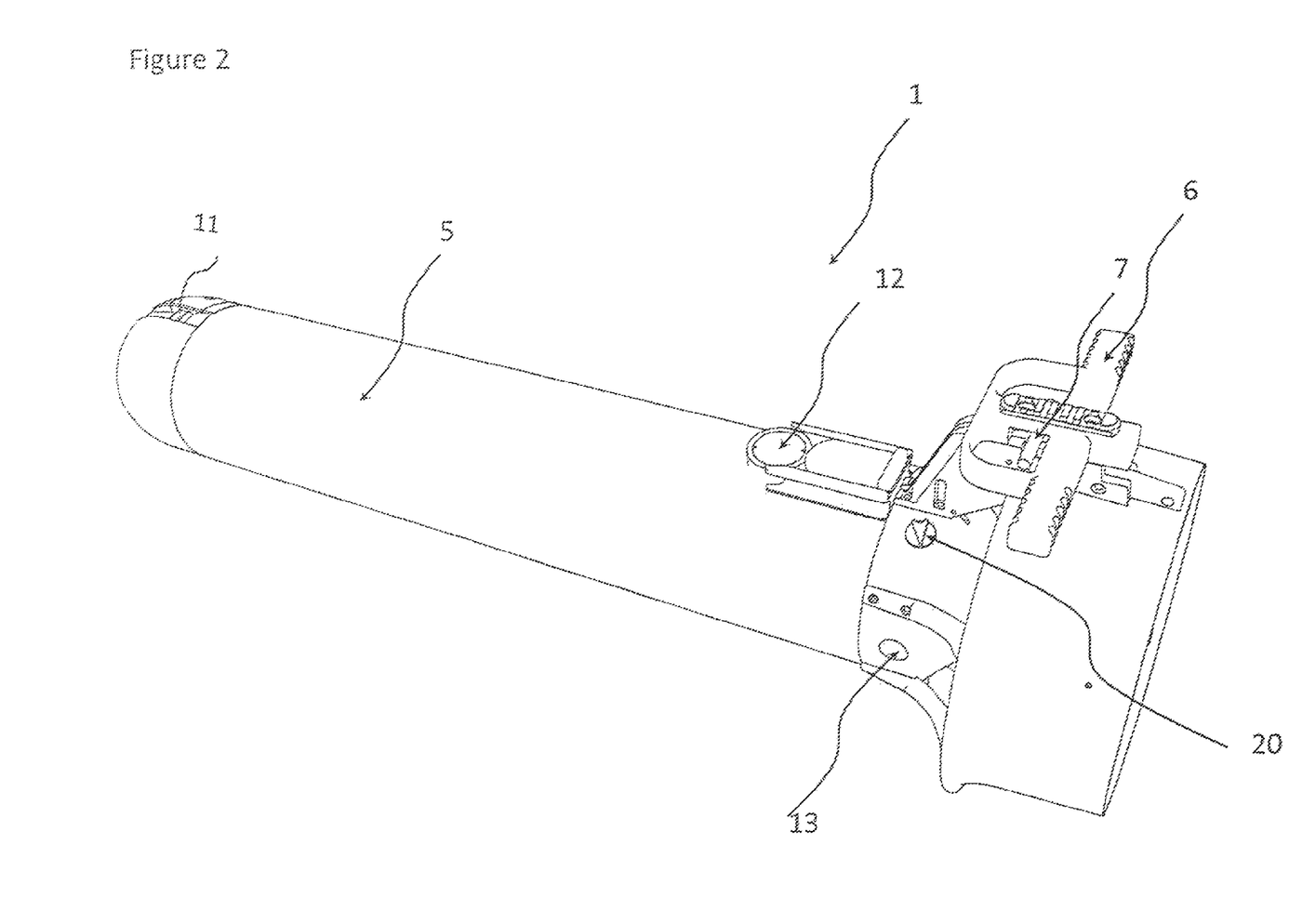
FIG. 2 illustrates a side view of the diver propulsion vehicle of FIG. 1.

FIG. 2 shows aside view of the diver propulsion vehicle 1 according to FIG. 1, and particularly illustrates the handle 6, the display 12, the trigger 7, the hull 5, the combined it receiver and transmitter 13 as well as a power switch 20 to turn offend on the diver propulsion vehicle 1.

Figure 3:
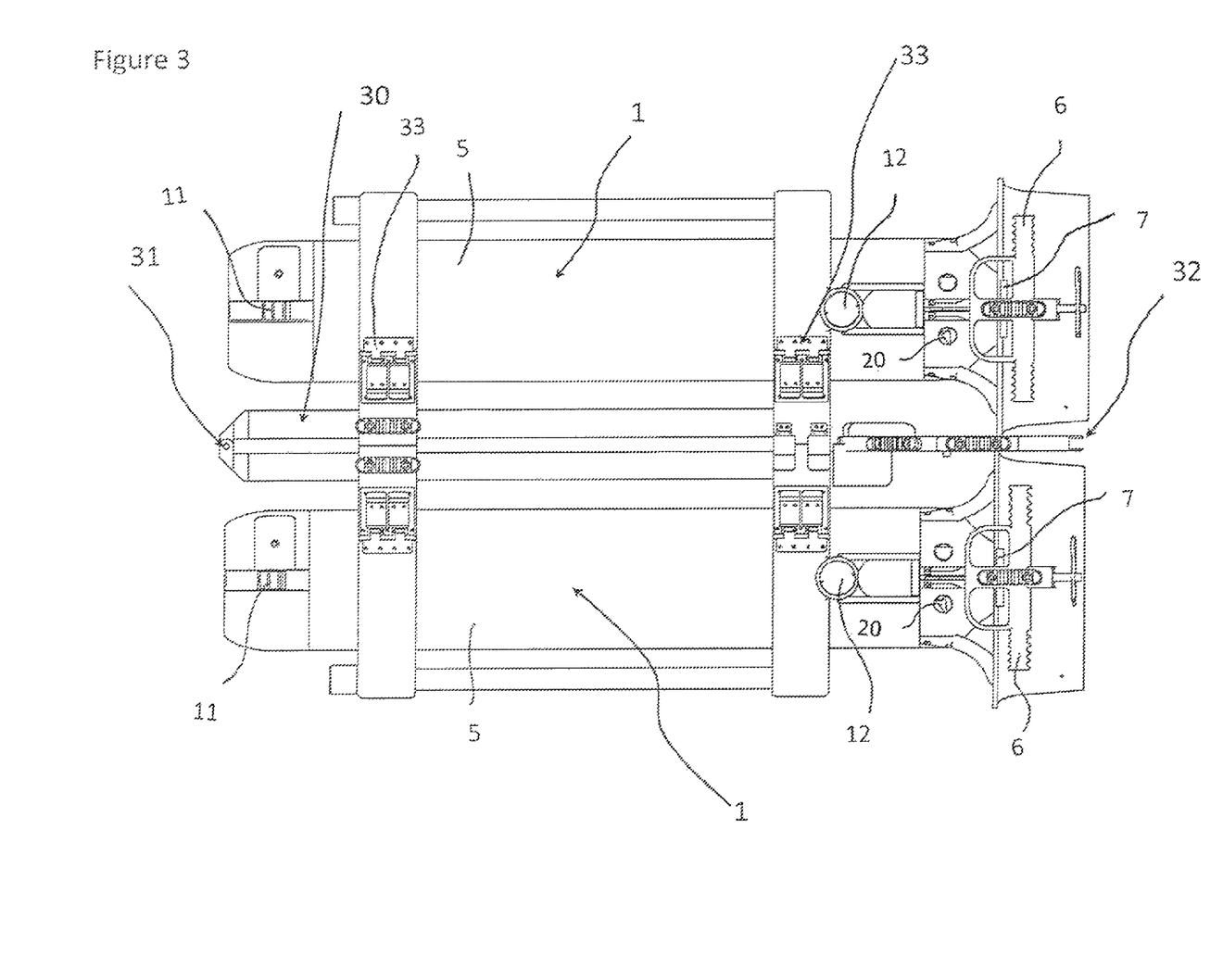
FIG. 3 illustrates an assembly of two diver propulsion vehicles mechanically connected to one another in a side-by-side configuration via a support according to an exemplary embodiment of the invention.

FIG. 3 shows an assembly according to an exemplary embodiment of the invention formed by two diver propulsion vehicles 1 of the type illustrated in FIG. 1 and FIG. 2 and being mechanically connected to one another by a support 30. In particular, FIG. 3 shows details as to how the two diver propulsion vehicles 1 may be connected to each other with the support 30. To be able to lock out the diver propulsion vehicle 1 from a submarine, the two diver propulsion vehicles 1 can be locked out separately and the divers assemble the diver propulsion vehicle 1 outside the submarine in the water. A mechanical barrier 32 is integrated in the support 30 to mechanically block the infrared transmission between two diver propulsion vehicles 1. The mechanical barrier 32 is positionable so as to mechanically block a wireless communication signal to thereby temporarily block wireless communication via the wireless communication interface 9, 10, 13. The individual diver propulsion vehicles 1 are fixed in the support 30 with clamps 33 or other fastening provisions, that can be hand-operated by a diver without tools. A joint 31 allows folding and unfolding of the support 30 around a folding axis which is perpendicular to the paper plane of FIG. 3.

The support 30 is hence configured for mechanically coupling the diver propulsion vehicles 1 each of which being configured for propelling a respective diver. In the operation mode of the support 30 shown in FIG. 3, the diver propulsion vehicles 1 are mechanically coupled to one another in a side-by-side configuration (which may also be denoted as a lateral configuration) in which the diver propulsion vehicles 1 are arranged or stacked along a direction (extending vertically according to FIG. 3) which is perpendicular to a traveling or motion direction of the diver propulsion vehicles 1 (extending horizontally according to FIG. 3) via the support 30.

While the support 30 serves for mechanically coupling the diver propulsion vehicles 1 to one another, the diver propulsion vehicles 1 are also communicatively coupled to one another. More particularly, the diver propulsion vehicles 1 are configured for wirelessly communicating with one another via their wireless communication interfaces 9, 10, 13 (in particular via their combined transmitters and receivers 13). As will be described below in further detail, the diver propulsion vehicles 1 are configured so that, in an event that the user of one of the diver propulsion vehicles 1 initiates wireless communication via the wireless communication interfaces 9, 10, 13 by actuating the respective trigger 7, the communication initiating diver propulsion vehicle 1 acts as master and the other diver propulsion vehicle 1 acts as slave during the wireless communication. A corresponding communication protocol may be executed by processors of the diver propulsion vehicles 1. When being communicatively coupled, the diver propulsion vehicles 1 are capable to synchronize the motors 2 of the diver propulsion vehicles 1 under control of the present master diver propulsion device 1 for a cooperating propelling of the plurality of diver propulsion vehicles 1 in a mechanically coupled state.

Figure 4:
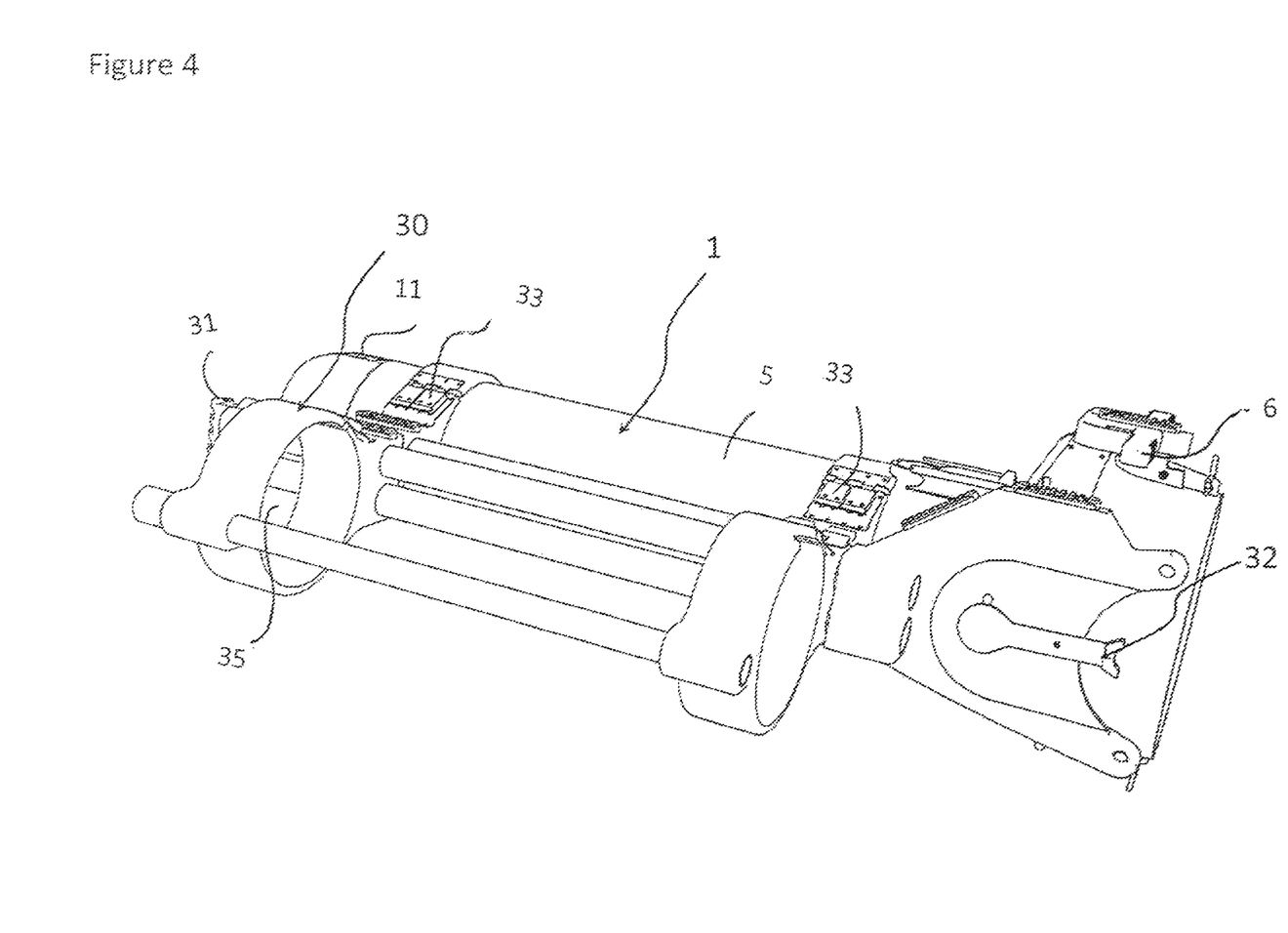
FIG. 4 illustrates the support of FIG. 3 with only one diver propulsion vehicle mounted thereon.

FIG. 4 details the support 30 of FIG. 3 with just one diver propulsion vehicle 1 inserted in a respective vehicle accommodation volume 35 within which the respective diver propulsion vehicle 1 is connectable to the support 30 by clamping. The opaque mechanical barrier 32 is also visible and presently covers the combined IR receiver and transmitter 13 of the shown diver propulsion vehicle 1.

Figure 5:
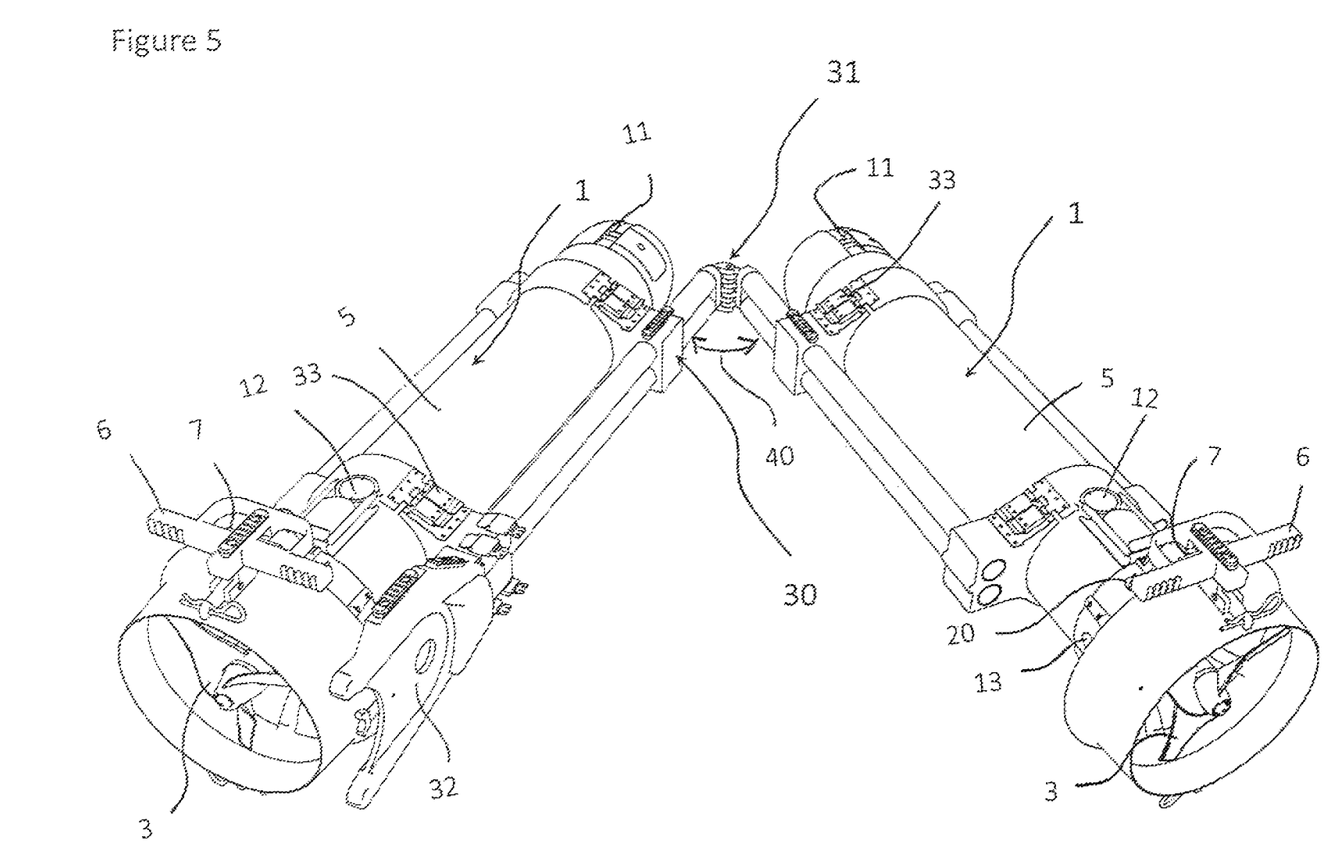
FIG. 5 illustrates the support of FIG. 3 in a partially folded state with two diver propulsion vehicles mounted thereon.

FIG. 5 shows how two diver propulsion vehicles 1 of the type as shown in FIG. 1 can be connected to each other with the foldable support 30 either in a side-by-side configuration (see FIG. 3) or in a longitudinal configuration (see FIG. 6), wherein an intermediate state is shown in FIG. 5). A folding/unfolding motion is indicated schematically in FIG. 5 by reference numeral 40. Joint 31 allows folding the support 30.

Figure 6:
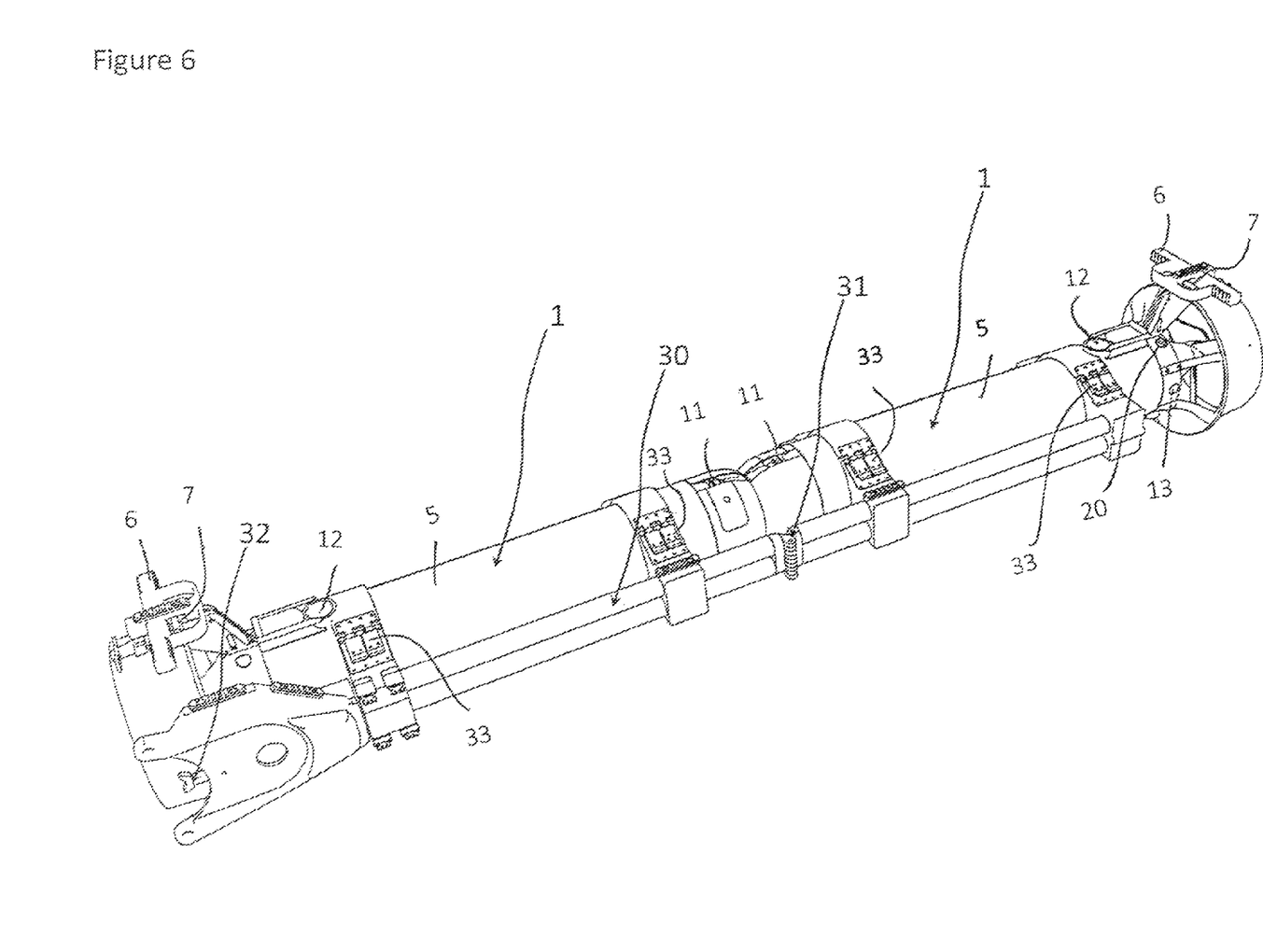
FIG. 6 illustrates an assembly of two diver propulsion vehicles mechanically connected to one another by the support of FIG. 3 in a longitudinal configuration.

FIG. 6 shows how the two diver propulsion vehicles 1 of FIG. 5 can be connected to each other with the foldable support 30 in a longitudinal configuration, so that they can be pre-configured and mounted together in a submarine due to the compact small dimensioned cross-sectional area. In this longitudinal configuration, the two diver propulsion vehicles 1 still fit into a hatch.

The support 30 is for mechanically coupling the diver propulsion vehicles 1 selectively in a side-by an configuration-side or in a longitudinal configuration via the support 30. The foldable support 30 is convertible between the folded state shown in FIG. 4, via the intermediate state shown in FIG. 5 into the unfolded state of FIG. 6 in which the diver propulsion vehicles 1 are mechanically coupled to one another and located longitudinally, i.e. one behind the other in traveling direction. The support 30 is convertible between these configurations by a simple pivoting motion (the reference numeral 40 in FIG. 5) which can be performed manually by a user, i.e. by hand operation without tools.

Figure 7:
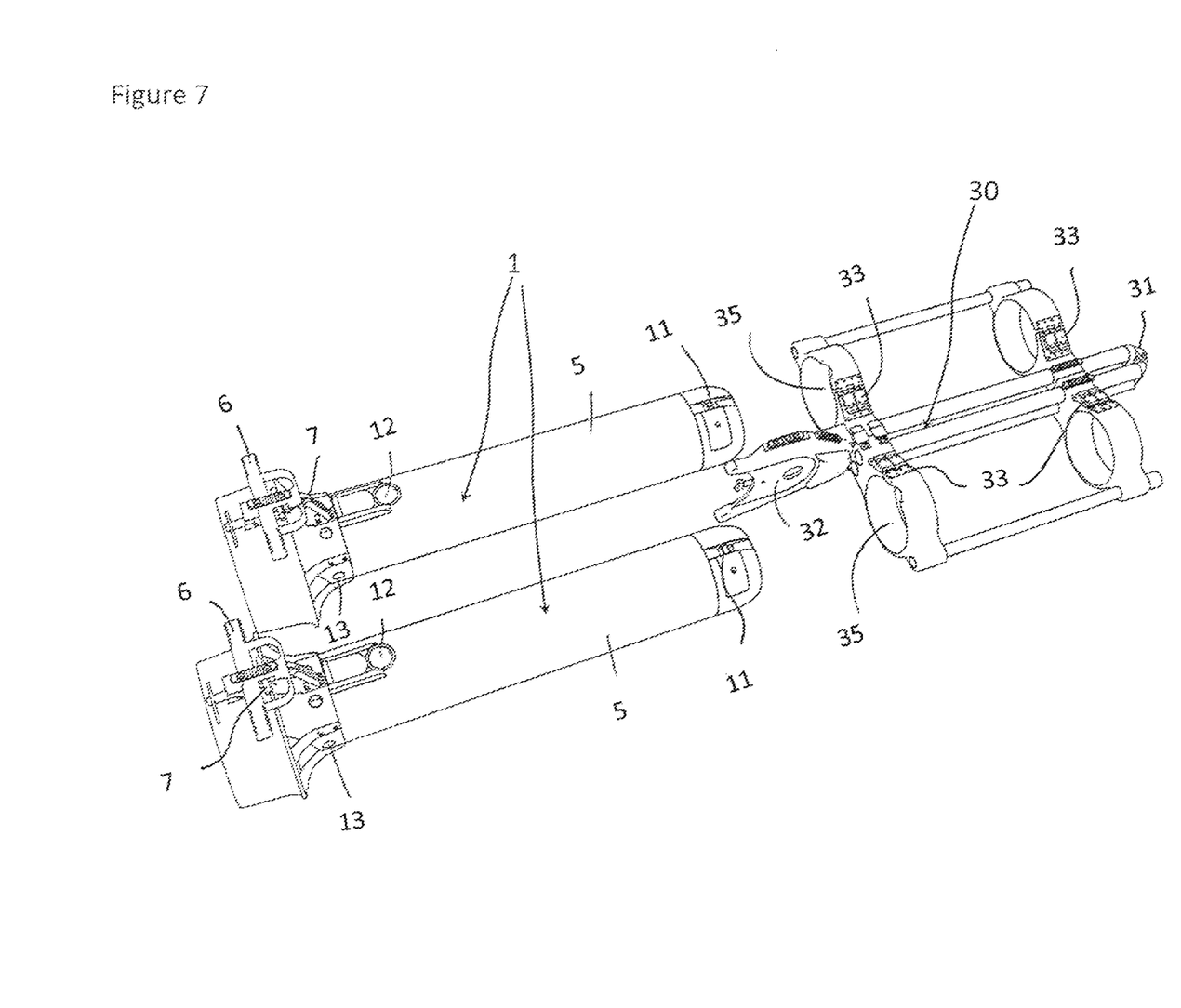
FIG. 7 illustrates two diver propulsion vehicles of FIG. 1 and the support of FIG. 3 not yet mounted to the diver propulsion vehicles.

FIG. 7 shows the support 30 of FIG. 3 and two diver propulsion vehicles 1 of FIG. 1 that are not yet connected, i.e. before the diver propulsion vehicles 1 have been inserted into the respective vehicle accommodation volumes 35.

Figure 8:
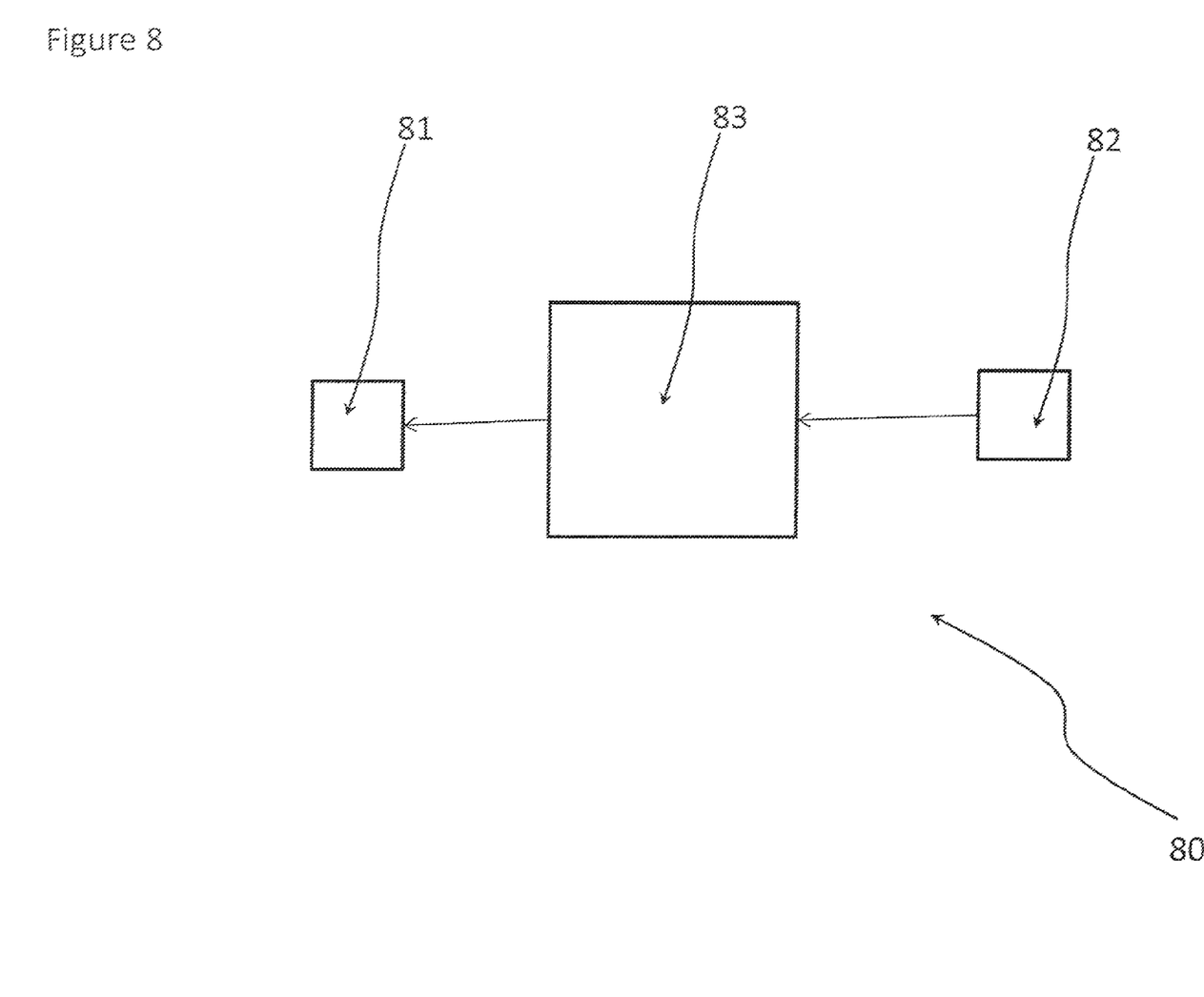
FIG. 8 illustrates a block diagram of a wireless communication circuit of a battery unit of a diver propulsion vehicle according to an exemplary embodiment of the invention.

FIG. 8 shows a block diagram of electronics of an IR transmitter 80 of the battery 4 according to an exemplary embodiment of the invention. IR transmitter 80 receives data from battery management system 82. A microcontroller 83 processes the information, generates a message, and adds a checksum. The information is then transmitted via an infrared diode 81.

Figure 9:
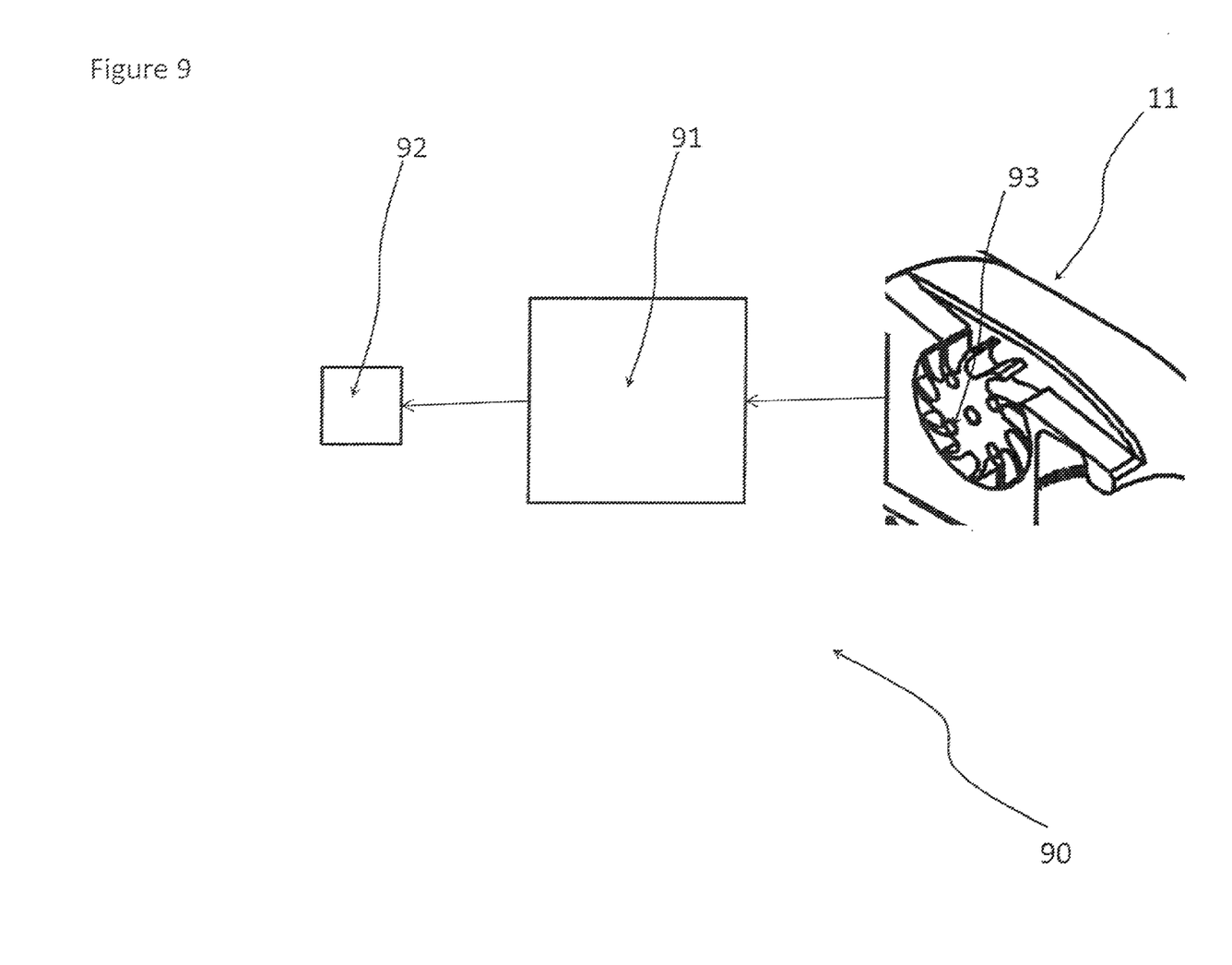
FIG. 9 illustrates a block diagram of a wireless communication circuit of a speech measurement unit of a diver propulsion vehicle according to an exemplary embodiment of the invention.

FIG. 9 shows a block diagram of electronics of an IR transmitter 90 of the speed measurement unit according to an exemplary embodiment of the invention. In a simple form, a speed measuring wheel 11 is equipped with one or more magnets 93, and their rotation is acquired with magnetic sensors. A square wave signal of the magnetic sensor has a frequency proportional to the turning speed of the wheel 11. A microcontroller 91 processes that signal and generates a message which may include turning velocity, distance travelled or velocity in water, etc. A checksum is added to the message. That message is transmitted via an infrared diode 92. Alternatively, a single IR transmitter may be used for both the battery 4 as well as the speed measurement unit.

Figure 10:
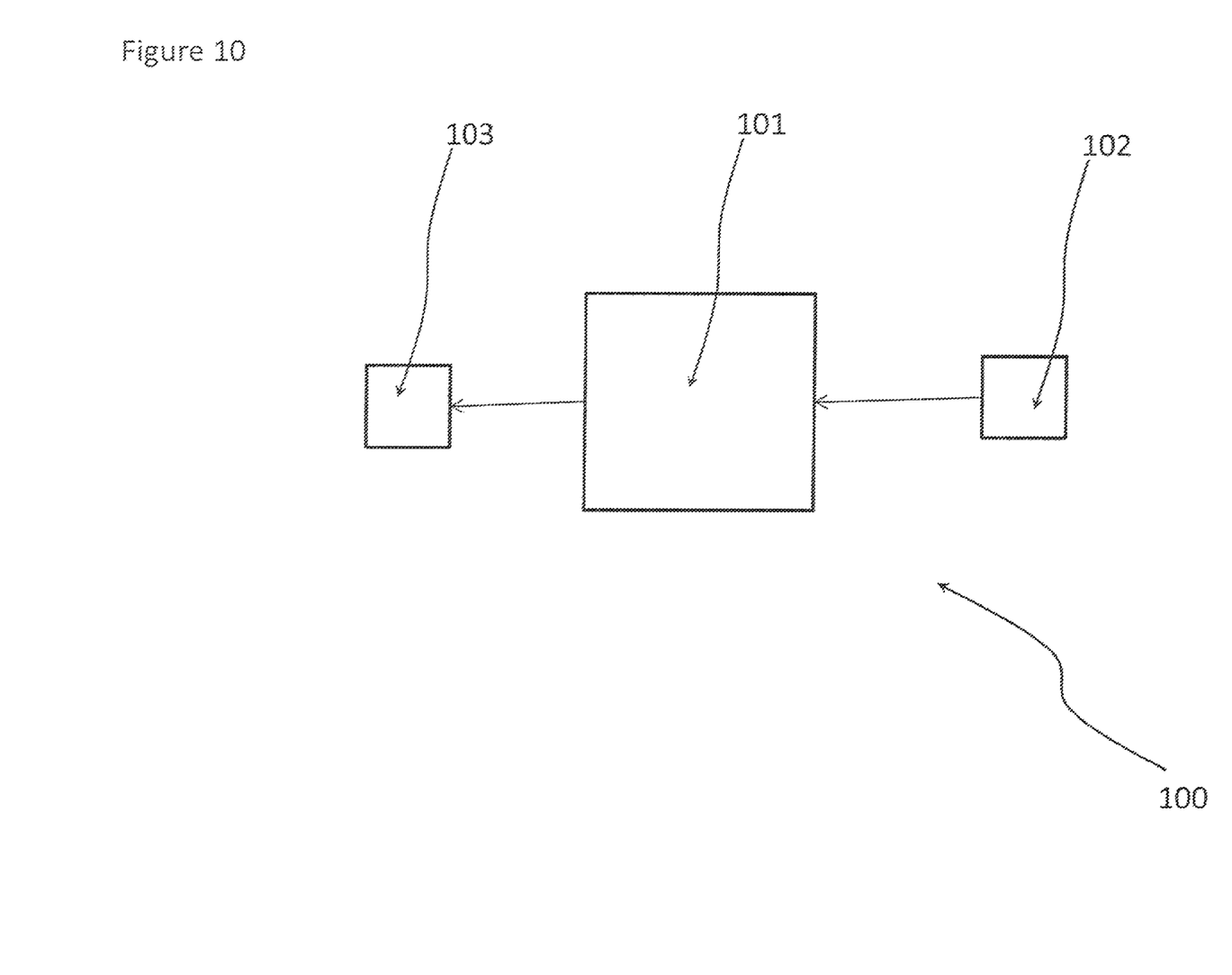
FIG. 10 illustrates a block diagram of a wireless communication circuit of a bridge circuit of a diver propulsion vehicle according to an exemplary embodiment of the invention.

FIG. 10 shows a configuration of IR transmitter bridge circuit 100 according to an exemplary embodiment of the invention. It comprises or consists of a microcontroller 101, an IR receiver 102 and an IR transmitter 103. Messages received with the IR receiver 102 are transmitted via an IR diode embodying the IR transmitter 103. The transmitted IR message can be the same as the one received, or it may be processed before by the microcontroller 101, thus the message can be filtered, some data from the received string may not be transmitted outside, some data may be added to the message string. If the message is changed, then also a new checksum may be calculated and added to the string.

In an embodiment, the diver propulsion vehicle 1 comprises at least one wireless communication bridge circuit 100 configured for receiving a wireless communication signal from a communication source and retransmitting a wireless communication signal to a communication destination, in particular a communication destination outside of the diver propulsion vehicle 1.

Figure 11:
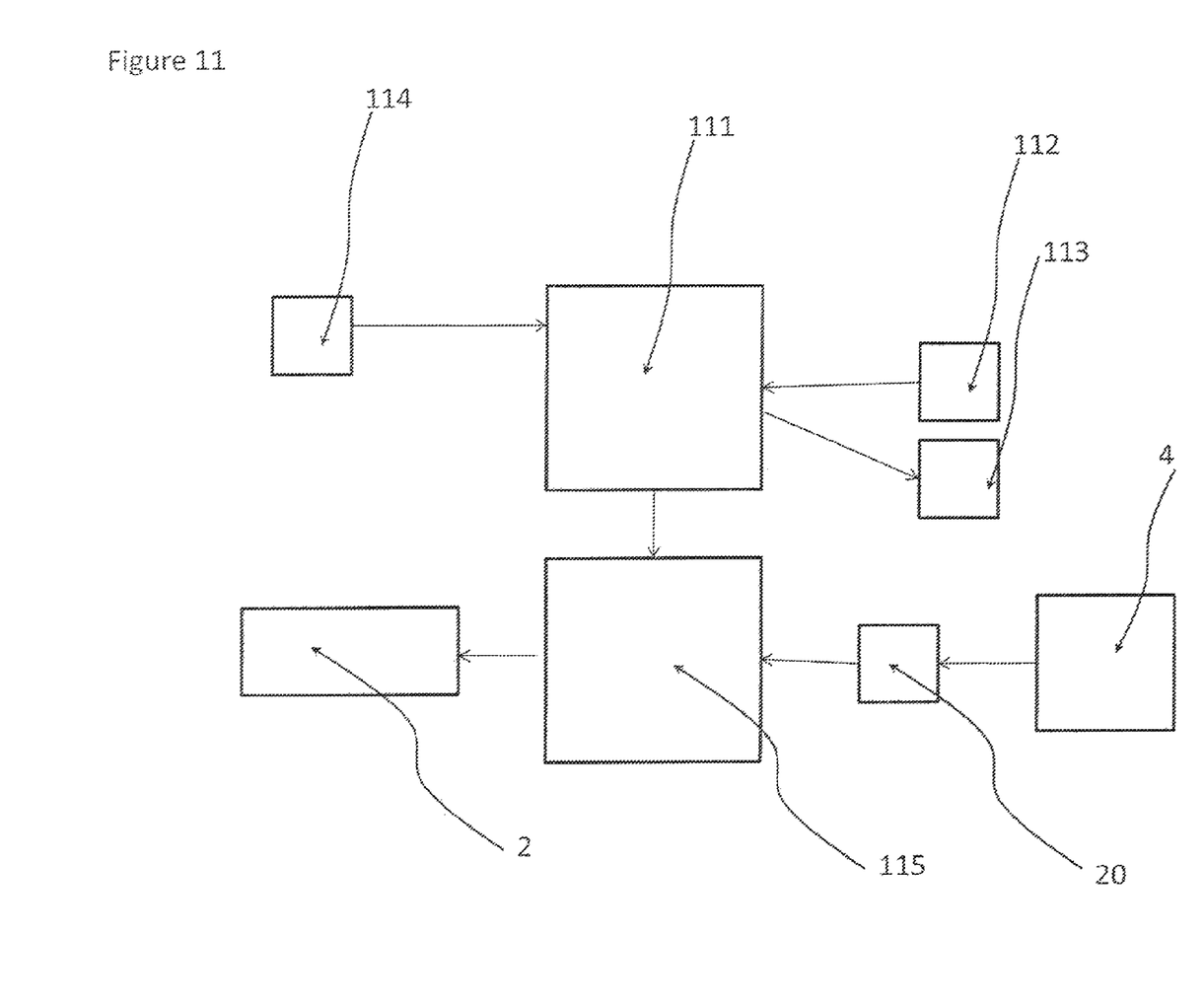
FIG. 11 illustrates a block diagram of a motor control system of a diver propulsion vehicle according to an exemplary embodiment of the invention.

FIG. 11 shows a motor control system for the motor 2 of the diver propulsion vehicle 1 according to an exemplary embodiment of the invention. Each diver propulsion vehicle 1 may be equipped with such a motor control system. A pulse width modulation (PWM) unit 115 is used to regulate the speed of the motor 2. The speed can be preselected with a potentiometer connected to the PWM unit 115. One or more switches 114 are used to switch the diver propulsion vehicle 1 on. The switches may be mechanical switches, optical switches, inductive switches or magnetic switches. The switches are actuated by the trigger 7. A microcontroller 111 senses if the switch is open or closed. When the trigger 7 located on the handle 6 of the diver propulsion vehicle 1 closes the switch, the microcontroller 111 switches on the PWM unit 115 and in the following the motor 2 of the diver propulsion vehicle 1 is powered. At the same time, the microcontroller 111 transmits IR messages with an IR transmitter 113 located on the side of the hull 5 of the diver propulsion vehicle 1, and the diver propulsion vehicle 1 acts as master diver propulsion vehicle 1.

If IR receiver 112 located on the side on the hull 5 of the diver propulsion vehicle 1 receives data of a master and the switch 114 is not closed, then this diver propulsion vehicle 1 acts as slave diver propulsion vehicle 1, and the motor 2 is controlled depending on the IR messages received from the master diver propulsion vehicle 1.

The diver propulsion vehicle 1 comprises a motor control unit 111 configured for controlling motor 2 for driving the diver propulsion vehicle 1 by wireless communication.

FIG. 11 also shows the battery 4 as well as the power switch 20 which is used to switch on and off the diver propulsion vehicle 1.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. A diver propulsion vehicle assembly comprising:
a plurality of diver propulsion vehicles, each configured for propelling at least one diver, wherein each diver propulsion vehicle comprises a wireless communication interface configured for providing a wireless communication, and
a support including a clamp for mechanically coupling the plurality of diver propulsion vehicles, the plurality of diver propulsion vehicles are mechanically coupled side-by-side or longitudinally via the support,
the plurality of diver propulsion vehicles being configured for wirelessly communicating with one another via the wireless communication interfaces and configured so that, in an event that one of the plurality of diver propulsion vehicles initiates or is controlled to initiate wireless communication via the wireless communication interfaces, the communication initiating diver propulsion vehicle acts as master and a remainder of the plurality of diver propulsion vehicles act as slave during the wireless communication.

2. The diver propulsion vehicle assembly according to claim 1, wherein the wireless communication interface is configured for providing an infrared communication or an electromagnetic communication.

3. The diver propulsion vehicle assembly according to claim 1, wherein each of the diver propulsion vehicles comprises at least one display located on a hull of the diver propulsion vehicle and/or on a handle of the diver propulsion vehicle, and configured for displaying data indicative of an operation of the diver propulsion vehicle.

4. The diver propulsion vehicle assembly according to claim 1, comprising at least one wireless communication bridge configured for receiving a wireless communication signal from a communication source and for transmitting a wireless communication signal to a communication destination outside of the diver propulsion vehicle.

5. The diver propulsion vehicle assembly according to claim 1, wherein each of the diver propulsion vehicles comprises a motor control unit configured for controlling a motor for driving the diver propulsion vehicle by wireless communication.

6. The diver propulsion vehicle assembly according to claim 5, wherein the plurality of diver propulsion vehicles are communicatively coupled so as to synchronize motors of the plurality of diver propulsion vehicles for a cooperating propelling of the plurality of diver propulsion vehicles.

7. The diver propulsion vehicle assembly according to claim 1, wherein each of the diver propulsion vehicles comprises at least one mechanical barrier operable to block a wireless communication signal to thereby disable wireless communication via the wireless communication interface.

8. A method of operating a diver propulsion vehicle assembly of diver propulsion vehicles mechanically coupled side-by-side or longitudinally via a support, each of the diver propulsion vehicles being configured for propelling at least one diver, wherein the method comprises wirelessly communicating by each of the diver propulsion vehicles to each other via a wireless communication interface of each of the diver propulsion vehicles, the wireless communicating being configured so that, in an event that one of the diver propulsion vehicles initiates or is controlled to initiate wireless communication via the wireless communication interfaces, the communication initiating diver propulsion vehicle acts as a master and the other diver propulsion vehicles act as slave during the wireless communication.

* * * * *